(12) United States Patent
Plüss et al.

(10) Patent No.: US 8,390,427 B2
(45) Date of Patent: Mar. 5, 2013

(54) DEVICE FOR READING DATA FROM A TRANSPONDER MODULE

(75) Inventors: Marcel Plüss, Tann (CH); Peter Plüss, Tann (CH); Alex Wyss, Wolfhausen (CH)

(73) Assignee: Legic Identsystems AG (CH)

( * ) Notice: Subject to any disclaimer, the term of this patent is extended or adjusted under 35 U.S.C. 154(b) by 498 days.

(21) Appl. No.: 12/635,132

(22) Filed: Dec. 10, 2009

(65) Prior Publication Data
US 2010/0148936 A1  Jun. 17, 2010

(30) Foreign Application Priority Data

Dec. 17, 2008 (EP) .................................. 08021900

(51) Int. Cl.
*G06K 19/00* (2006.01)

(52) U.S. Cl. .......... 340/5.61; 340/5.1; 340/5.2; 340/5.6; 340/5.7; 340/10.1; 70/277

(58) Field of Classification Search ................. 340/10.1, 340/10.3–10.34, 10.4–10.42, 10.5–10.52, 340/10.6, 5.1, 5.2, 5.3, 5.32, 5.6, 5.61, 5.7, 340/5.72; 70/277–283.1
See application file for complete search history.

(56) References Cited

U.S. PATENT DOCUMENTS

| | | | |
|---|---|---|---|
| 6,359,547 B1 * | 3/2002 | Denison et al. | 340/5.73 |
| 6,720,861 B1 * | 4/2004 | Rodenbeck et al. | 340/5.64 |
| 7,057,512 B2 * | 6/2006 | Stilp | 340/572.1 |
| 7,518,514 B2 * | 4/2009 | Bauchot et al. | 340/572.1 |
| 7,642,916 B2 * | 1/2010 | Phipps et al. | 340/572.7 |
| 8,120,459 B2 * | 2/2012 | Kwak | 340/5.2 |
| 2004/0083374 A1 * | 4/2004 | Sugawara | 713/189 |
| 2004/0100386 A1 * | 5/2004 | Tendler | 340/573.3 |
| 2006/0119469 A1 * | 6/2006 | Hirai et al. | 340/5.61 |
| 2006/0226948 A1 * | 10/2006 | Wright et al. | 340/5.25 |

* cited by examiner

*Primary Examiner* — Jennifer Mehmood
*Assistant Examiner* — Ryan Sherwin
(74) *Attorney, Agent, or Firm* — Ostrolenk Faber LLP

(57) ABSTRACT

A reader device in accordance with an embodiment of the present disclosure includes an antenna connected electrically to a processing unit through an antenna connection element. The processing unit controls are configured to read data from a transponder module via an electromagnetic field. The reader device includes a user interface unit which is connected to the processing unit through the connection element and includes a data output part and/or a data input part. The data output part receives via the connection element reader data from the processing unit and outputs this data. The data input part receives via a data entry element user data and transmits this data via the connection element to the processing unit. Thus, user authentication data can be entered by the user and transmitted to the processing unit without the need for additional wiring between the user interface and the processing unit.

15 Claims, 3 Drawing Sheets

DEVICE FOR READING DATA FROM A TRANSPONDER MODULE

BACKGROUND

1. Field of the Disclosure

The present invention relates to a reader device for reading data from a transponder module. Specifically, the present invention relates to a reader device comprising an antenna for reading via an electromagnetic field data from a transponder module, the reader device comprising a processing unit for controlling the reading, and an antenna connection element connecting electrically the antenna to the processing unit.

2. Related Art

Particularly for identification purposes and for access control applications, it is very popular to use mobile and portable transponders which contain identification data that can be read in a contactless way by appropriate reader devices via an electromagnetic field. This technology is commonly known as radio frequency identification or RFID. Accordingly, the transponder modules are called RFID tags or RFID transponders. Transponder modules comprise an antenna and a microchip connected thereto. Typically, the microchip includes a data store containing stored (user or product) identification information. Transponder modules are implemented in various forms such as labels, cards, bracelets or key tags. A reader device comprises a processing unit and an antenna connected to the processing unit. Typically, in access control applications the reader's antenna is located in a publicly accessible area, whereas the reader's processing unit is arranged for security reasons separate from the antenna. For example, in connection with a door locking mechanism, the processing unit is located on the side (inside) of the door facing the room to be controlled, while the antenna is arranged on the opposite side (outside) of the door.

An example of such an arrangement is described in EP 0 730 073 where an antenna is integrated in the exterior plate of an electrical door lock. The antenna is wire connected through the lock to a reader device arranged on the interior side of the door.

Alternatively, e.g. for installations in the United States, the processing unit as well as the antenna are arranged on the same side of the door, whereas the power supply, e.g. the battery, is arranged on the opposite side of the door.

Although reading identification data by way of an electromagnetic field from transponder modules makes possible contactless access control systems, the level of security may not be sufficient for critical applications where the use of a transponder by an unauthorized person, e.g. a person who acquired the transponder module illegally, should be detected in order to prevent unauthorized access. Furthermore, it may be useful to provide to a user of the system personalized information in connection with access to the system, e.g. time recording information such as numbers of hours worked, amount of vacation time left, etc.

SUMMARY

It is an object of this disclosure to provide a reader device which makes it possible to read via an electromagnetic field data from a transponder module without at least some of the limitations of the prior art readers. In particular, it is an object of the present disclosure to provide a reader device for reading via an electromagnetic field data from a transponder module, which reader device provides some measures for detecting a person using a transponder module without authorization.

According to the present disclosure, these objects are achieved particularly through the features of the independent claims. In addition, further advantageous embodiments follow from the dependent claims and the description.

For reading via an electromagnetic field data, e.g. user identification data, from a transponder module, e.g. a mobile and portable RFID transponder module, particularly an RFID card, a reader device comprises a reader antenna, a processing unit configured to control the reading, and an antenna connection element connecting electrically the reader antenna to the processing unit.

According to the present invention, the above-mentioned objects are particularly achieved in that the reader device further comprises a user interface unit connected to the processing unit through the antenna connection element. The user interface unit includes a data output part and/or a data input part. The data output part is configured to receive from the processing unit reader data via the antenna connection element, and to output the reader data. For example, the reader data includes personalized data provided by the processing unit or a computerized host unit based on user identification data and/or user authentication information. For example, the data output part comprises one or more data output elements such as a data display device and/or an electro acoustic converter. The data input part is configured to receive user data via a data entry element, and to transmit the user data via the antenna connection element to the processing unit. For example, the user data includes user authentication information, e.g. a password or PIN code. For example, the data input part comprises one or more data input elements, e.g. data entry elements such as a keypad. Preferably, the reader device further comprises a microcontroller which is configured to control the data input/output elements and connected to the processing unit through the antenna connection element. Connecting a user interface unit to the processing unit through the antenna connection element has the advantage that user authentication data can be entered by the user and transmitted to the processing unit without the need for additional wiring between the user interface and the processing unit. Thus, there is no need for installing and connecting any additional wires which is particularly advantageous in combination with electrical locks for doors of different thickness.

Preferably, the processing unit is configured to control the reading of data from the transponder module according to an RFID protocol. Moreover, the data output part includes a demodulator for receiving the reader data transmitted by the processing unit according to the RFID protocol; and the data input part includes a modulator for transmitting the user data to the processing unit according to the RFID protocol. For example, the data input part includes a load modulator for modulating the user data for the processing unit. Providing the user interface unit with a modulator and demodulator for exchanging data between the processing unit and the user interface unit according to a RFID protocol has the advantage that there is no need to alter the processing unit. As a matter of fact, for the processing unit, the user interface unit appears and is processed as a conventional (RFID) transponder module.

In a preferred embodiment, the user interface unit comprises a data store with a stored device identifier. Furthermore, the user interface unit is configured to transmit the device identifier via the antenna connection element to the processing unit; and the processing unit is configured to attribute to the user interface unit, based on the device identifier, user data received via the antenna connection element. Transmitting a device identifier from the user interface to the processing unit makes it possible for the processing unit to distinguish the user interface unit from a mobile transponder module. In an embodiment, the device identifier is a one-time session key, generated by the user interface unit for one communication session.

In an embodiment, the user interface unit comprises a rectifier connected to the antenna connection element and to a microcontroller of the user interface unit. The rectifier is configured to supply power to the microcontroller from a carrier signal received from the processing unit through the antenna connection element. For example, the processing unit is configured to generate and modulate a carrier signal. The carrier signal has a frequency in the range of 100 KHz to 2.5 GHz, for example. Particularly, the carrier signal is set to the working frequency of an RFID system, e.g. 6.78 MHz, 13.56 MHz, or 27.12 MHz (or another multiple of 13.56 MHz).

In an embodiment the user interface unit is connected electrically to the antenna connection element. In a further embodiment the processing unit is connected to a power supply; and the reader device is provided with a connection of the power supply to the antenna connection element for supplying DC power through the antenna connection element to the user interface unit. In yet another embodiment, the processing unit is connected to a primary power supply and the reader device further comprises an emergency power supply unit, e.g. a battery or a connector for connecting an emergency power source. The emergency power supply unit is connected to the antenna connection element for supplying power to the processing unit in case of a failure of the primary power supply. In addition, the emergency power supply unit is preferably connected to the microcontroller of the user interface unit for supplying power to the microcontroller in case of a failure of the primary power supply.

In an alternative embodiment, the user interface unit comprises an interface antenna, and the user interface is connected inductively to the antenna connection element through the interface antenna and the reader antenna. In this embodiment, for the processing unit, with the exception of the device identifier provided by the user interface, there appears virtually no difference between the fixed user interface unit and a conventional mobile and portable (RFID) transponder module.

In a further embodiment, the reader device comprises a first housing containing the processing unit, and a second housing containing the user interface unit. Accordingly, the antenna connection element is arranged with one end at the first housing and with an opposite end at the second housing. For example, the first housing and the second housing are parts of an electrical door lock, and the antenna connection element includes an electrically conducting part of the door lock. Alternatively, the antenna connection element includes an antenna cable.

BRIEF DESCRIPTION OF THE DRAWINGS

The present invention will be explained in more detail, by way of example, with reference to the drawings in which.

DETAILED DESCRIPTION OF THE EMBODIMENTS

Figure 1:
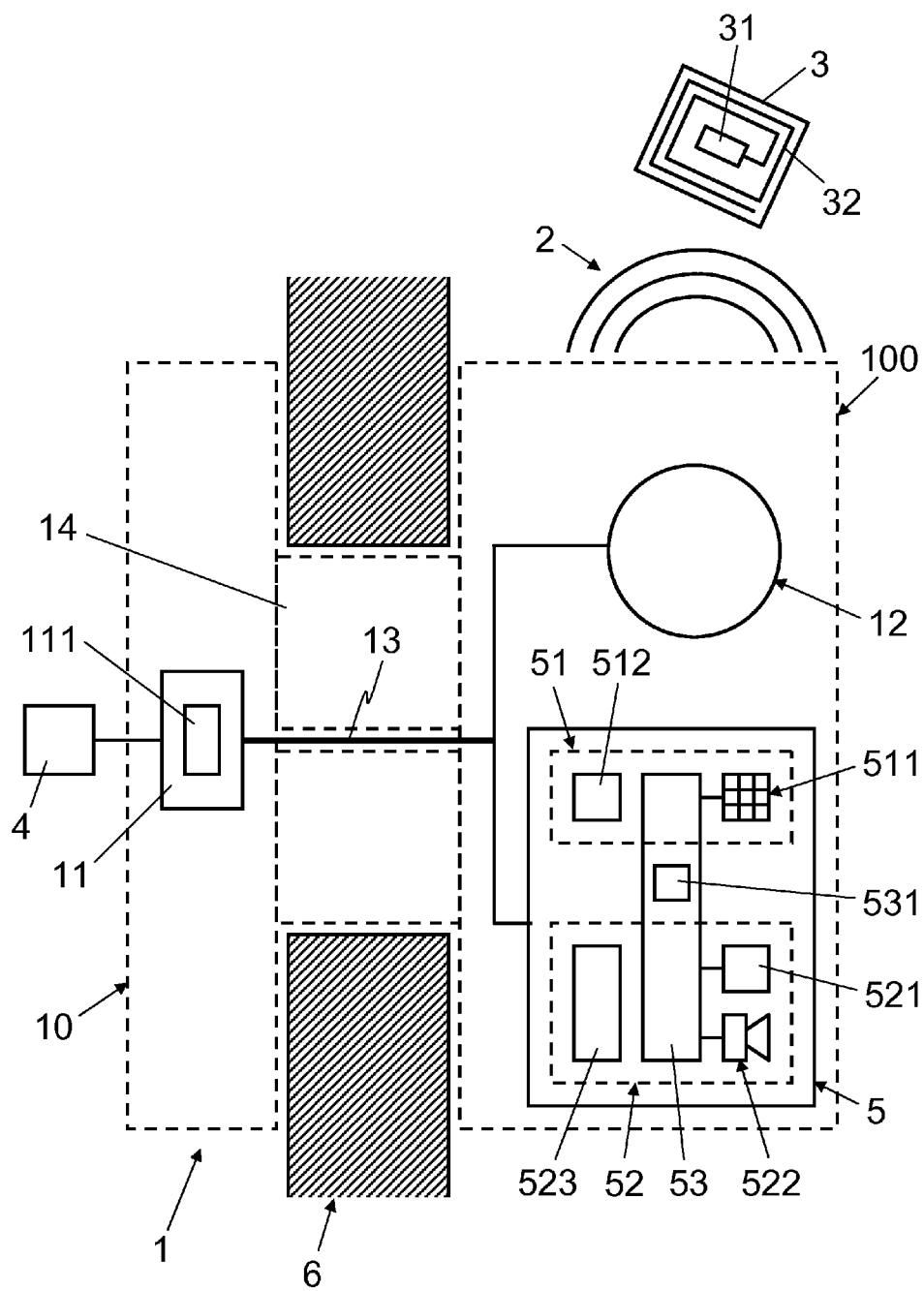
FIG. 1 shows a block diagram illustrating schematically a reader device for reading data from a transponder module, the reader device has a user interface unit which is connected electrically through an antenna connection element to a processing unit of the reader.
Figure 2:
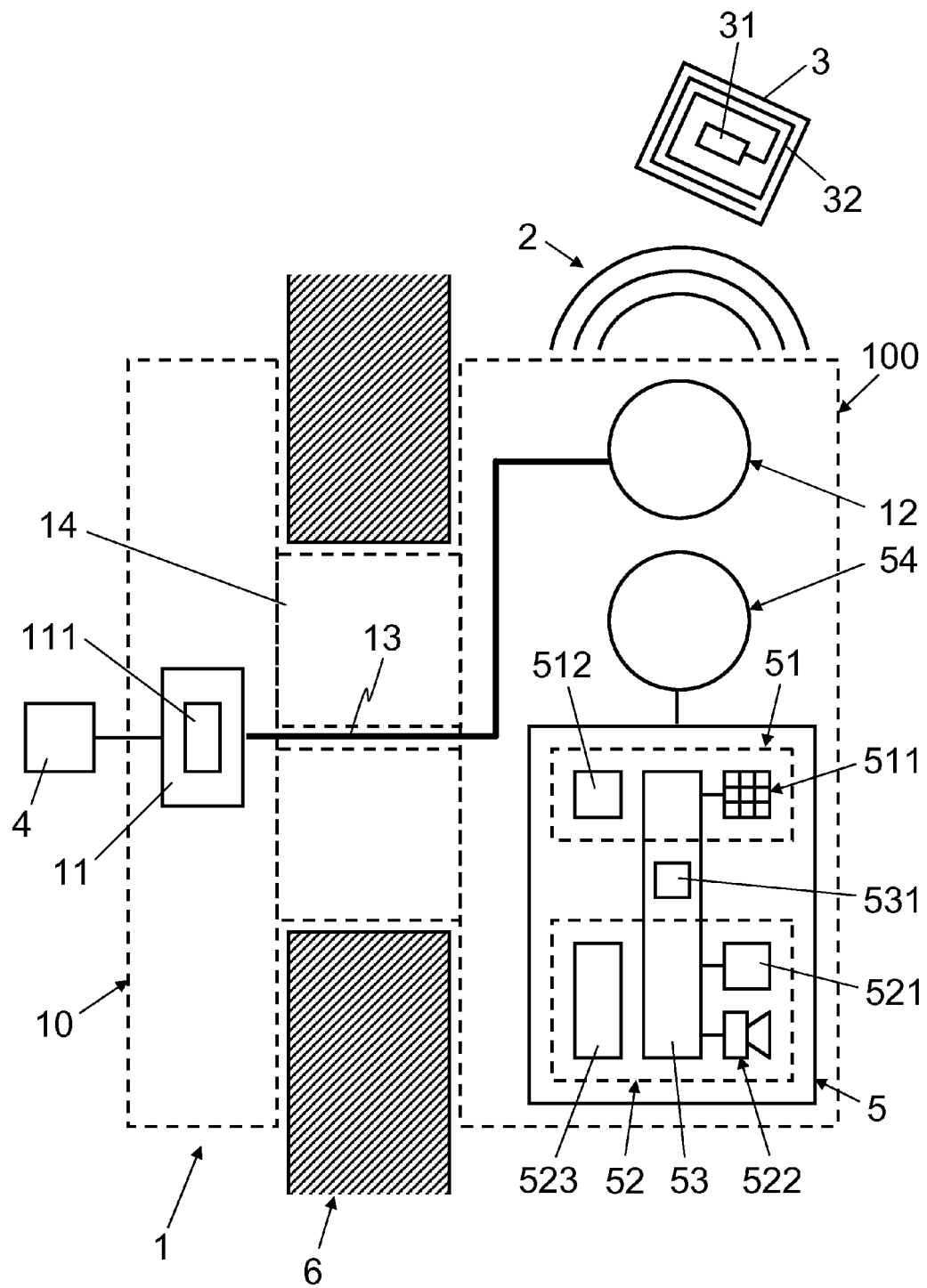
FIG. 2 shows a block diagram illustrating schematically a reader device for reading data from a transponder module, the reader device has a user interface unit which is connected inductively through an antenna connection element to the reader's processing unit.

In FIGS. 1-4, reference numeral 1 refers to a reader device for reading data from a transponder module 3, e.g. an RFID transponder, via an electromagnetic field 2, e.g. according to a standardized RFID protocol as defined in standards such as ISO 18092, ISO 15693, or ISO 14443, or according to a proprietary data transmission or RFID protocol. As illustrated in FIGS. 1 and 2, the transponder module 3 comprises a (processing) chip 31 connected to an antenna 32. The chip 31 includes stored data, e.g. user (or product) and/or transponder identification data. Through antenna 12, the reader device 1 emits a field of magnetic waves 2 which field induces energy into the transponder module 3 and triggers the transponder module 3 to transmit a response to the reader device 1, for example as defined by RFID protocol standards. Typically (but not necessarily), the reader device 1 is further configured to write data onto the transponder module 3 via the electromagnetic field 2, e.g. according to a standardized RFID protocol. Thus, reader device 1 is actually a reader/writer device.

As illustrated in FIGS. 1-4, the reader device 1 includes a processing unit 11 for controlling the (RFID) reading process and, optionally, for interfacing with a computerized host unit 4, i.e. a superordinate processing unit. Preferably, the processing unit is a programmed microprocessor. As shown in FIGS. 1-4, the processing unit 11 is electrically connected to the antenna 12 through an antenna connection element 13. Depending on the embodiment, the antenna connection element 13 includes an antenna cable, as indicated schematically in FIG. 3, or an electrically conducting (and insulated) element of a door lock 14, for example. Alternatively, the antenna connection element 13 includes a wave guide.

As shown in FIGS. 1-4, in addition to antenna 12, a user interface unit 5 is connected to the antenna connection element 13 and, thus, to the processing unit 11. In the embodiments according to FIGS. 1, 3 and 4, the user interface unit 5 is connected electrically to the antenna connection element 13, i.e. there is a contact-based connection between the user interface unit 5 and the antenna connection element 13 and, thus, the processing unit 11. In the embodiment shown in FIG. 2, the user interface unit 5 includes an interface antenna 54 and is connected inductively via the reader antenna 12 to the antenna connection element 13. In essence, in the latter embodiment, the user interface unit is connected to the processing unit 11 as is a mobile portable transponder module 3, but attached fixed to the reader device 1.

As shown in FIGS. 1 and 2, in an embodiment, the reader device 1 comprises a first housing 10 containing the processing unit 11, and a second housing 100 comprising the antenna 12 and the user interface unit 5. In this configuration, the antenna connection element 13 is attached with one of its ends to the processing unit 11 in the first housing 10. With its other end, the antenna connection element is attached in the second housing 100 to antenna 12 and, according to FIG. 1, to the user interface unit 5.

Furthermore, FIGS. 1 and 2 illustrate a scenario where the reader device 1 is integrated in a (electrical) door lock 14. In this scenario, the first housing 10 with the processing unit 11 is located on the side (inside) of the door 6 (or a wall, room or building, etc.) facing the room to be controlled, whereas the second housing 100 with the antenna 12 and user interface unit 5 is arranged on the opposite side (outside) of the door 6 (or wall, room or building, etc.). Thus, the antenna connection element 13, i.e. a wire of an antenna cable, a conducting part of the door lock 14 or a wave guide, runs through an opening (bore) through the door 6 and connects the processing unit 11 to antenna 12 and user interface unit 5.

It shall be pointed out here that application of the reader device 1 is not limited to door locks 14, but includes virtually any application with a transponder based access control. For example, in further applications the reader device 1 is integrated in a vending machine, e.g. a drink dispenser, coffee machine or a gas/petrol pump, a public communication terminal, e.g. a (networked) computer, a telefax machine, an ATM or a telephone, or other electronic equipment such as a photo copier or scanner. Accordingly, user data entered via the user interface includes device specific information and/or access/authorization codes.

As illustrated in FIGS. 1 and 2, the user interface unit 5 comprises a data output part 52 and a data input part 51. The data input part 51 includes one or more data input elements, i.e. data entry elements 511 such as one or more buttons or a keypad, for example. The data output part 52 comprises one or mote data output elements, e.g. a display 521 such as one or more LEDs, an LED display or an LCD display, and/or an electro acoustic converter 522, such as a beeper, a buzzer or a loudspeaker.

The user interface unit 5 further comprises a microcontroller 53, or a corresponding programmed logic unit, connected to the data input/output elements and configured to control the data input/output elements, i.e. to receive data entered by a user via the data input elements and/or to render visually and/or acoustically data received from the processing unit 5. Preferably, microcontroller 53 is a very low power microprocessor such as a TI MSP430 microcontroller by Texas Instruments Corp., or an AVR picoPower microcontroller by Atmel Corp.

The user interface unit 5 also includes a data store comprising a device identifier 531, i.e. a code identifying the user interface unit 5 to the processing unit 11 as a special purpose communication entity, distinct from the mobile, portable transponder modules 3. For that purpose, the processing unit 11 includes a device detector module 111, preferably a programmed software module, configured to detect and determine device identifiers included in downlink data transmissions received in the processing unit 11 to via the antenna connection element 13. Thus, the device detector module 111 is configured to associate with the user interface unit 5 data input received in downlink data transmissions, based on the device identifier. Consequently, the device detector module 111 is configured to detect and determine user input data (e.g. user authentication data) received from the user interface unit 5 through the antenna connection element 13. Depending on the implementation, the processing unit 11 or the computerized host 4 performs the verification of user authentication data with respect to the user identification read from the user's corresponding transponder module 3, before access is granted and the lock 14 is opened, for example. In an embodiment, the device identifier is a one-time session key, generated and stored temporarily by the user interface unit 5 for one communication session. One skilled in the art will understand that there are alternative authentication and/or identification mechanisms and protocols suitable for establishing the user interface unit 5 as a defined communication partner to the processing unit 11.

As is schematically shown in FIGS. 1 and 2, the data input part 51 includes a modulator 512 configured to modulate data received through data input elements for downlink data transmission, from the user interface unit 5, via the antenna connection element 13, to the processing unit 11. The data output part 52 comprises a demodulator 523 configured to demodulate data received via uplink data transmission, from the processing unit 11, via the antenna connection element 13, to the user interface unit 5. Preferably, the data is modulated or demodulated, respectively, as for any conventional transponder module 3, e.g. according to an RFID standard (protocol).

Figure 3:
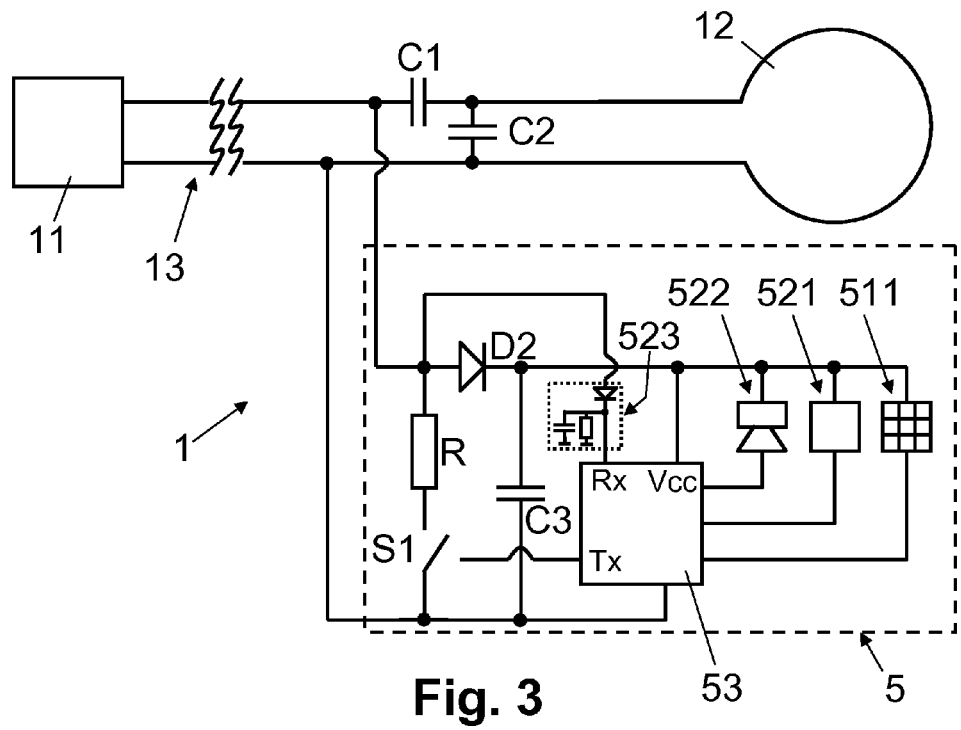
FIG. 3 shows a circuit diagram illustrating schematically an embodiment of the user interface unit having a load modulator in a downlink for transmitting data to the reader's processing unit.
Figure 4:
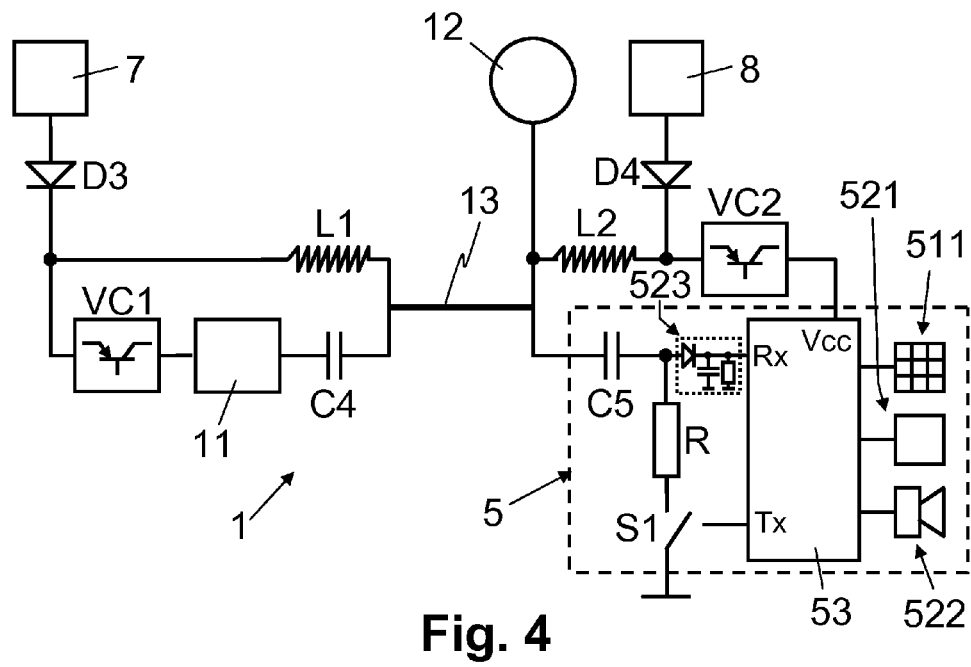
FIG. 4 shows a circuit diagram illustrating schematically an embodiment of the user interface unit having an emergency power supply connected electrically through the antenna connection element to the reader's processing unit.

FIGS. 3 and 4 illustrate an embodiment of modulator 512 as a load modulator for downlink data transmission from the microcontroller's 53 transmission output Tx. The load modulator is implemented with load resistor R and switch S1, e.g. a transistor. Switch S1 is controlled by microcontroller 53 through transmission output Tx. Correspondingly, processing unit 11 is configured to detect on the antenna connection element 13 the load modulation performed by the user interface unit 5 and, thus, receive respective data input from the user interface unit 5 via the antenna connection element 13.

FIGS. 3 and 4 illustrate an embodiment of demodulator 523 as an AM (Amplitude Modulation) demodulator for uplink data transmission to the data transmission input Rx of microcontroller 53. The AM demodulator is implemented with a diode and an RC circuit, for example. Correspondingly, processing unit 11 is configured to modulate data through AM of the carrier signal on the antenna connection element 13, e.g. a (high frequency) carrier signal with a frequency in the range of 100 KHz to 2.5 GHz, for example, set at the working frequency of an RFID system, e.g. 6.78 MHz, 13.56 MHz, or 27.12 MHz or another multiple of 13.56 MHz. In an alternative embodiment, the demodulator 523 is integrated in microcontroller 53. For example, the integrated demodulator 523 comprises an A/D-converter stage and/or a detector configured to detect data input based on the presence or absence of a signal on data transmission input Rx, in accordance with the processing unit 11 turning on/off the carrier signal on the antenna connection element 13. One skilled in the art will understand that various other known modulation/demodulation techniques, e.g. phase modulation or phase shift keying, and corresponding types of demodulators 523 are applicable for uplink data transmission from the processing unit 11 to the microcontroller 53.

FIG. 3 further illustrates an embodiment of supplying power through voltage input Vcc to microcontroller 53, based on the carrier signal received in the user interface unit 5 over the antenna connection element 13. For that purpose, the user interface unit 5 comprises a rectifier, implemented by diode D2, in the example of FIG. 3. Furthermore, the rectified carrier signal is smoothed by a smoothing filter, implemented by capacitor C3, in the example of FIG. 3.

In the embodiment of FIG. 4, a DC component is added to the carrier signal for supplying power to the user interface 5 through the antenna connection element 13. In the example of FIG. 4, the voltage input for processing unit 5 is generated from the output of power supply 7 through diode D3 and voltage controller VC1. Diode D3 blocks off the power supply 7 and works as a rectifying diode in case of AC power. The DC component is imposed as a voltage offset onto the processing unit's carrier signal output (AC) through inductivity L1, e.g. a coil. In the user interface unit 5, the added DC component is received through the antenna connection element 13 and filtered from the transmission input Rx by capacitor C5. On the other hand, the voltage input Vcc for microcontroller 53 is generated from the DC component received with the carrier signal on antenna connection element 13, by filtering the high frequencies with inductivity L2, e.g. a coil, and regulating the DC component using voltage controller VC2.

FIG. 4 also illustrates an emergency power supply from the side of the user interface unit 5, through the antenna connection element 13 to the processing unit 11. Reference 8 refers to an emergency power supply unit, e.g. a battery, a connector for connecting manually an emergency power source, or a wireless interface for providing emergency power by induction from an external contactless power source. The emergency power supply unit 8 is blocked off by rectifying diode D4. In case of emergency, i.e. upon failure of the reader's power supply 7, the microcontroller 53 is powered by the emergency power supply unit 8 through diode D4 and voltage controller VC2. Accordingly, the processing unit 11 is powered by the emergency power supply unit 8 through diode D4, inductivity L2 (coil), antenna connection element 13, inductivity L1 (coil), and voltage controller VC1.

What is claimed is:

1. A reader device comprising:
    a reader antenna for reading data from a transponder module via an electromagnetic field,
    a processing unit configured to control the reading of the data from the transponder module; and
    an antenna connection element connecting electrically the reader antenna to the processing unit; wherein the reader device further comprises:
        a user interface unit connected to the processing unit through the antenna connection element and including at least one of a data output part and a data input part,
        the data output part comprising a demodulator configured to demodulate reader data received via uplink transmission, from the processing unit via the antenna connection element to the user interface unit, and the data output part being configured to output the reader data, and
        the data input part being configured to receive from a user, user data via a data entry element, and the data input part comprising a modulator configured to modulate the user data for downlink data transmission, from the user interface unit via the antenna connection element to the processing unit.

2. The reader device of claim 1, wherein the processing unit is configured to control the reading of the data from the transponder module according to a Radio Frequency Identification (RFID) protocol; the data output part includes a demodulator for receiving the reader data transmitted by the processing unit according to the Radio Frequency Identification (RFID) protocol; and the data input part includes a modulator for transmitting the user data to the processing unit according to the Radio Frequency Identification (RFID) protocol.

3. The reader device of claim 1, wherein the user interface unit comprises a data store including a device identifier; the user interface unit is configured to transmit the device identifier via the antenna connection element to the processing unit; and, based on the device identifier, the processing unit is configured to attribute to the user interface unit user data received via the antenna connection element.

4. The reader device of claim 1, wherein the data input part includes a load modulator for modulating the user data for the processing unit.

5. The reader device of claim 1, wherein the user interface unit comprises one or more data input/output elements including at least one of a data display device, an electroacoustic converter and a data entry element, and a microcontroller configured to control the data input/output elements, and connected to the processing unit through the antenna connection element.

6. The reader device of claim 1, wherein the user interface unit comprises a rectifier connected to the antenna connection element and to a microcontroller of the user interface unit, the rectifier being configured to supply power to the microcontroller from a carrier signal received from the processing unit through the antenna connection element.

7. The reader device of claim 1, wherein the user interface unit is connected electrically to the antenna connection element.

8. The reader device of claim 1, wherein the user interface unit comprises an interface antenna; and the user interface unit is connected inductively to the antenna connection element through the interface antenna and the reader antenna.

9. The reader device of claim 1, wherein the processing unit is connected to a power supply; and the reader device is provided with a connection of the power supply to the antenna connection element for supplying Direct Current (DC) power through the antenna connection element to the user interface unit.

10. The reader device of claim 1, wherein the processing unit is connected to a primary power supply; and the reader device further comprises an emergency power supply unit, the emergency power supply unit being connected to the antenna connection element for supplying power to the processing unit in case of a failure of the primary power supply, and the emergency power supply unit being connected to a microcontroller of the user interface unit for supplying power to the microcontroller in case of a failure of the primary power supply.

11. The reader device of claim 1, wherein the reader device further comprises a first housing containing the processing unit, and a second housing containing the user interface unit; and the antenna connection element is arranged with one end at the first housing and with an opposite end at the second housing.

12. The reader device of claim 11, wherein a first housing and a second housing are parts of an electrical door lock; and the antenna connection element includes an electrically conducting part of the electrical door lock.

13. The reader device of claim 1, wherein the antenna connection element includes an antenna cable.

14. The reader device of claim 1, wherein the processing unit is connected to a computerized host unit; the user data includes user authentication information; and the reader data includes personalized data provided by the host unit based on the user authentication information.

15. The reader device of claim 1, wherein the transponder module is a mobile and portable Radio Frequency Identification (RFID) transponder module, particularly an Radio Frequency Identification (RFID) card; and the processing unit is configured to generate and modulate a carrier signal with a frequency in a range of 100 KHz to 2.5 GHz.

* * * * *